US012282589B2

(12) United States Patent
Demange

(10) Patent No.: US 12,282,589 B2
(45) Date of Patent: Apr. 22, 2025

(54) ELECTRONIC DEVICE INCLUDING AN ELECTRONIC MODULE AND A COMPENSATION CIRCUIT

(71) Applicant: STMicroelectronics (Rousset) SAS, Rousset (FR)

(72) Inventor: Nicolas Demange, Saint-Maximin la Sainte Baume (FR)

(73) Assignee: STMicroelectronics (Rousset) SAS, Rousset (FR)

(*) Notice: Subject to any disclaimer, the term of this patent is extended or adjusted under 35 U.S.C. 154(b) by 193 days.

(21) Appl. No.: 18/167,521

(22) Filed: Feb. 10, 2023

(65) Prior Publication Data

US 2023/0267237 A1 Aug. 24, 2023

(30) Foreign Application Priority Data

Feb. 23, 2022 (FR) ..................... 2201616

(51) Int. Cl.
*G06F 21/81* (2013.01)
*H02M 3/155* (2006.01)
(Continued)

(52) U.S. Cl.
CPC ............ *G06F 21/81* (2013.01); *H02M 3/155* (2013.01); *H03F 3/45475* (2013.01); *H03K 17/6871* (2013.01)

(58) Field of Classification Search
CPC ........ G06F 21/81; G06F 21/755; G06F 21/75; G06F 21/71; H02M 3/155; H03F 3/45475;
(Continued)

(56) References Cited

U.S. PATENT DOCUMENTS

| 4,932,053 A | 6/1990 | Fruhauf et al. |
| 6,107,868 A | 8/2000 | Diniz et al. |

(Continued)

FOREIGN PATENT DOCUMENTS

| CN | 106560757 A | 4/2017 |
| CN | 109656305 A | 4/2019 |

(Continued)

OTHER PUBLICATIONS

Das, Debayan et al., "EM and Power SCA-Resilient AES-256 Through > 350X Current-Domain Signature Attenuation and Local Lower Metal Routing", IEEE Journal of Solid-State Circuits, vol. 56, No. 1, Jan. 2021, 15 pages.

(Continued)

*Primary Examiner* — Jung Kim
(74) *Attorney, Agent, or Firm* — Slater Matsil, LLP

(57) ABSTRACT

An electronic device includes a power supply terminal, a voltage regulator connected to the power supply terminal, an electronic module connected to the voltage regulator, and a compensation circuit configured to receive an auxiliary current generated by the voltage regulator and being equal to a first fraction of the electronic module current. The compensation circuit includes a current source configured to supply a source current to a cold point, and a compensation stage connected to the power supply terminal and being traversed by an intermediate current equal to a difference between the source current and the auxiliary current and by a complementary current equal to the intermediate current multiplied by an inverse multiplication factor of the first fraction.

14 Claims, 3 Drawing Sheets

(51) Int. Cl.
*H03F 3/45* (2006.01)
*H03K 17/687* (2006.01)

(58) Field of Classification Search
CPC .............. H03K 17/6871; H03K 17/687; H03K 17/6872; H03K 17/6874; H03K 17/693; G06K 19/07363; G06K 19/07309
See application file for complete search history.

(56) References Cited

U.S. PATENT DOCUMENTS

| | | | |
|---|---|---|---|
| 7,227,401 | B2 | 6/2007 | Zhang et al. |
| 7,372,965 | B1 | 5/2008 | Wuidart |
| 7,571,492 | B2 | 8/2009 | Hubert |
| 7,605,575 | B2 | 10/2009 | Leutgeb et al. |
| 7,808,842 | B1 | 10/2010 | Raghavan et al. |
| 8,305,134 | B2 | 11/2012 | Hirose et al. |
| 8,334,705 | B1 | 12/2012 | Gunnam et al. |
| 8,635,467 | B2 | 1/2014 | Gunnam et al. |
| 8,780,517 | B2 | 7/2014 | Fukami |
| 8,786,359 | B2 | 7/2014 | Bhuiyan |
| 9,678,525 | B2 | 6/2017 | Demange et al. |
| 9,787,171 | B2 | 10/2017 | Fort |
| 9,891,639 | B2 | 2/2018 | Fort et al. |
| 10,054,973 | B2 | 8/2018 | Demange et al. |
| 10,122,270 | B2 | 11/2018 | Nagda et al. |
| 10,642,304 | B1 * | 5/2020 | Shreepathi Bhat ..... G05F 3/225 |
| 11,037,522 | B2 | 6/2021 | Naccari et al. |
| 11,507,704 | B2 | 11/2022 | Nedovic et al. |
| 2005/0027471 | A1 | 2/2005 | Vergnes |
| 2005/0218872 | A1 | 10/2005 | Wich |
| 2006/0125463 | A1 | 6/2006 | Yen et al. |
| 2006/0156039 | A1 | 7/2006 | Deveaud et al. |
| 2015/0001938 | A1 | 1/2015 | Fort |
| 2017/0192448 | A1 | 7/2017 | Demange et al. |
| 2021/0181778 | A1 | 6/2021 | Fort et al. |
| 2022/0066488 | A1 | 3/2022 | Demange et al. |
| 2022/0066494 | A1 | 3/2022 | Demange et al. |

FOREIGN PATENT DOCUMENTS

| | | | |
|---|---|---|---|
| EP | 0368727 | A1 | 5/1990 |
| EP | 0523266 | A1 | 1/1993 |
| FR | 2857804 | A1 | 1/2005 |
| FR | 3007857 | A1 | 1/2015 |
| WO | 9966452 | A2 | 12/1999 |
| WO | 2004027688 | A2 | 4/2004 |

OTHER PUBLICATIONS

Karagounis, Michael et al., "An Integrated Shunt-LDO Regulator for Serial Powered Systems", IEEE Proceedings of ESSCIRC, Greece, Sep. 14-18, 2009, 4 pages.

Li, Xuequn et al., "An Integrated Current Flattening Module for Embedded Cryptosystems", IEEE International Symposium on Circuits and Systems, May 23-26, 2005, Japan, 4 pages.

Mesquita et al., "Current Mask Generation: A Transistor Level Security Against DPA Attacks," SBCCI'05, Brazil, ACM, Sep. 4-7, 2005, pp. 115-120.

Serrano-Gotarredona, Teresa et al., "Voltage Clamping Current Mirrors with 13-decades Gain adjustment Range Suitable for Low Power MOS/Bipolar Current Mode Signal Processing Circuits", IEEE International Symposium on Circuits and Systems, Jul. 31, 1998, 4 pages.

Vahedi, Haleh et al., "On-chip current flattening circuit with dynamic voltage scaling," School of Engineering, University of Guelph, Guelph, Canada, IEEE International Symposium on Circuits and Systems, May 21, 24, 2006, pp. 4277-4280.

* cited by examiner

ELECTRONIC DEVICE INCLUDING AN ELECTRONIC MODULE AND A COMPENSATION CIRCUIT

CROSS-REFERENCE TO RELATED APPLICATIONS

This application claims the benefit of French Patent Application No. 2201616, filed on Feb. 23, 2022, which application is hereby incorporated herein by reference.

TECHNICAL FIELD

Implementations and embodiments of the invention relate to systems on chip, and in particular to the protection of these systems on chip against external attacks of the simple power analysis ("SPA") type.

BACKGROUND

Systems on a chip can be the target of attacks aimed at the recovery of secure information, and in particular attacks by power analysis or SPA.

In operation, a system on chip consumes more or less depending on the operations it performs. The SPA attack includes the analysis of these variations in consumption in order in particular to deduce indications on the operations carried out and/or on their occurrences.

In secure applications, it is therefore recommended to smooth as much as possible the consumption seen from the power supply so that a potential attacker can hardly determine the activity of the various components of the system on chip by SPA attacks.

French Patent Application No. 19/14244 describes a solution against SPA attacks. The proposed solution describes an electronic device comprising first generation means connected to a power supply terminal of an electronic module, in particular a microprocessor. The module is configured to consume a module current. The first generation means are configured to generate for each module an auxiliary module current equal to a first fraction of the corresponding module current. The electronic device also comprises a first stage, connected to the power supply terminal, including at least one current source configured to supply a stage current greater than the sum of the maximum values of each auxiliary module current. The device further comprises second generation means configured to generate an intermediate current equal to a difference between the stage current and a secondary current equal to the sum of each auxiliary module current. The electronic device also comprises a regulation stage connected to the power supply terminal comprising a first branch configured to generate a reference potential from the intermediate current, a second branch comprising a regulation means and comparison means configured to voltage drive the regulation means so that a potential of the second branch is equal to the reference potential, the potential being obtained by multiplying a current flowing in the branch by an impedance equal to the first fraction. The device further comprises a terminal stage connected to the power supply terminal and configured to multiply the intermediate current by a multiplication factor equal to one.

Such a device allows creation in a simple manner of a plurality of currents consumed by the power supply, the sum of which does not depend on the current consumed by the electronic module but only in theory on the current supplied by the current source stage. The sum of the currents consumed is then relatively constant. The consumption of the integrated circuit is therefore smoothed, and this smoothed overall consumption seen from the outside is greater than the sum of the maximum consumptions of each module.

To have good performance, it is important that the current smoothing means quickly follow the current drawn by the voltage regulator to best smooth the current delivered by the power supply.

However, the electronic device has several stages controlled by two amplifiers, which clutter the electronic device, and generate additional delays and power consumption. These delays do not allow to obtain a sufficiently fast response for smoothing the current in applications with a high operating frequency of the electronic module, for example of the order of 115 MHz. The high frequency causes a more abrupt current inrush between slow phases and faster phases of activity of the electronic module. The compensation delay then causes peaks in the current delivered by the power supply source and therefore generates a signature of the operation of the electronic module that can be used to carry out a consumption analysis attack.

There is therefore a need to provide a compensation circuit that is more responsive to variations in current drawn by the electronic module.

SUMMARY

According to one aspect, provision is made of an electronic device comprising:
  a power supply terminal configured to be able to be connected to a power supply source,
  at least one voltage regulator connected to the power supply terminal,
  at least one electronic module, in particular a microprocessor, connected to the at least one voltage regulator and configured to be able to consume an electronic module current coming from the power supply source,
  a compensation circuit connected to the at least one voltage regulator and configured to receive an auxiliary current generated by the at least one voltage regulator and being equal to a first fraction of the electronic module current consumed by the at least one electronic module, the compensation circuit including:
  a current source connected to the at least one voltage regulator so as to receive the auxiliary current and being configured to supply to a cold point a source current greater than a maximum value of the electronic module current consumed by the at least one electronic module,
  a compensation stage including:
  a first resistor and a second resistor each having a first terminal connected to the power supply terminal, the first resistor having a resistive value equal to a resistive value of the second resistor multiplied by the multiplication factor, the first resistor having a second terminal connected to the current source so as to be traversed by an intermediate current equal to a difference between the source current and the auxiliary current,
  a transistor having a drain connected to a second terminal of the second resistor and a source connected to the cold point,
  an operational amplifier configured to control the transistor and having an inverting input connected to the second terminal of the first resistor and a non-inverting input connected to the second terminal of the second resistor, so that the second resistor is traversed by a complementary current equal to the intermediate current multiplied by the multiplication factor.

The compensation circuit is configured to consume a current passing through the compensation stage in addition to the current drawn by the electronic module so that the sum of the currents drawn by the compensation circuit and the electronic module is constant.

Such a compensation circuit allows smoothing of the current seen from the power supply terminal in order to conceal the current drawn by the electronic module connected to the at least one voltage regulator.

Such a compensation circuit comprises a limited number of stages, which allows it to improve its responsiveness to variations in current drawn by the electronic module, to reduce its power consumption as well as its physical size. Such a compensation circuit allows in particular to avoid copying errors of the current mirrors used in the electronic device described by the French Patent Application No. 19/14244. Such a compensation circuit is also inexpensive.

It is possible to provide an electronic device including a single voltage regulator and a single electronic module connected to the voltage regulator. Of course, it is also possible to provide an electronic device including several voltage regulators and several electronic modules connected to the various voltage regulators. The compensation circuit then has an input for each voltage regulator so as to receive the auxiliary currents generated by the various voltage regulators. The current source and the compensation stage are then connected to the various voltage regulators.

In an advantageous embodiment, the current source and the compensation stage are connected to the at least one regulator via a transistor controlled by an operational amplifier having an inverting input connected to a source of this transistor and a non-inverting input configured to receive a voltage delivered by the at least one regulator to the electronic module. This transistor and this amplifier allow to obtain a potential at a drain of this transistor identical to the potential between the at least one regulator and the at least one electronic module so as to ensure an auxiliary current in accordance with the current supplying the electronic module.

When the electronic device includes several voltage regulators and several electronic modules, the current source and the compensation stage are connected to the various regulators via several parallel branches each including a transistor controlled by an operational amplifier as described above.

Preferably, the compensation stage includes:
a first transistor having a drain connected to the second terminal of the first resistor and a source connected to the current source so that the second terminal of the first resistor is connected to the current source via the first transistor, and
a second transistor having a drain connected to the second terminal of the second resistor and a source connected to the drain of the transistor so that the second terminal of the second resistor is connected to the drain of the transistor via the second transistor,
the first transistor and the second transistor having a gate configured to receive a fixed voltage allowing the first transistor and the second transistor to operate as cascodes. This fixed voltage can be that delivered by the at least one regulator to the electronic module.

This first transistor allows the potential at the second terminal of the first resistor to vary freely according to the current passing through this first resistor. This second transistor allows protection of the transistor of the compensation stage controlled by the operational amplifier from high voltages, and allows the potential at the second terminal of the second resistor to vary freely according to the current passing through this second resistor.

Advantageously, the current source comprises at least one current mirror configured to generate the source current from a reference current. Thus, the current source may comprise a single or several current mirrors to generate the source current. When the current source includes several current mirrors, the latter can be activated or deactivated according to the desired value of the source current.

In an advantageous embodiment, the current source includes:
a reference branch comprising:
a reference transistor of the at least current mirror,
a cascode transistor having a drain configured to receive the reference current and connected to a gate of the reference transistor, a source connected to a drain of the reference transistor, and a gate configured to receive a fixed voltage,
a transistor having a drain connected to a source of the reference transistor, a source connected to the cold point and a gate configured to receive a voltage delivered by the at least one regulator to the electronic module,
an auxiliary current generation branch for each current mirror including:
a copy transistor of the current mirror having a gate connected to a gate of the reference transistor and being configured to at least partly generate the source current,
a cascode transistor having a drain connected to the second output of the at least one regulator, a source connected to a drain of the copy transistor,
a selection transistor having a drain connected to a source of the copy transistor, a source connected to the cold point and a gate configured to be controlled by a selection signal.

The reference current can be of the order of 5 µA for example. Each current mirror includes the reference transistor and a copy transistor allowing multiplying of the reference current. The sum of the currents generated by each current mirror corresponds to the source current generated by the current source.

Each selection transistor allows activation or deactivation of the current mirror with which it is associated in order to modify the value of the source current generated by the current source.

Advantageously, the cascode transistor of the generation branch of each current mirror has a gate configured to receive a fixed voltage.

Preferably, the cascode transistor is common to each generation branch, the current source further including an operational amplifier having a non-inverting input connected to the drain of the reference transistor, an inverting input connected to the source of the common transistor, and an output connected to the gate of the transistor. The operational amplifier then allows obtaining of a drain voltage of the copy transistor of the current mirror identical to the voltage at the drain of the reference transistor of the current mirror. It is thus possible to use a smaller common cascode transistor allowing reducing of parasitic capacitances so that the compensation circuit is more reactive to current variations.

BRIEF DESCRIPTION OF THE DRAWINGS

Other advantages and features of the invention will appear upon examining the detailed description of non-limiting embodiments and the appended drawings wherein.

DETAILED DESCRIPTION OF ILLUSTRATIVE EMBODIMENTS

Figure 1:
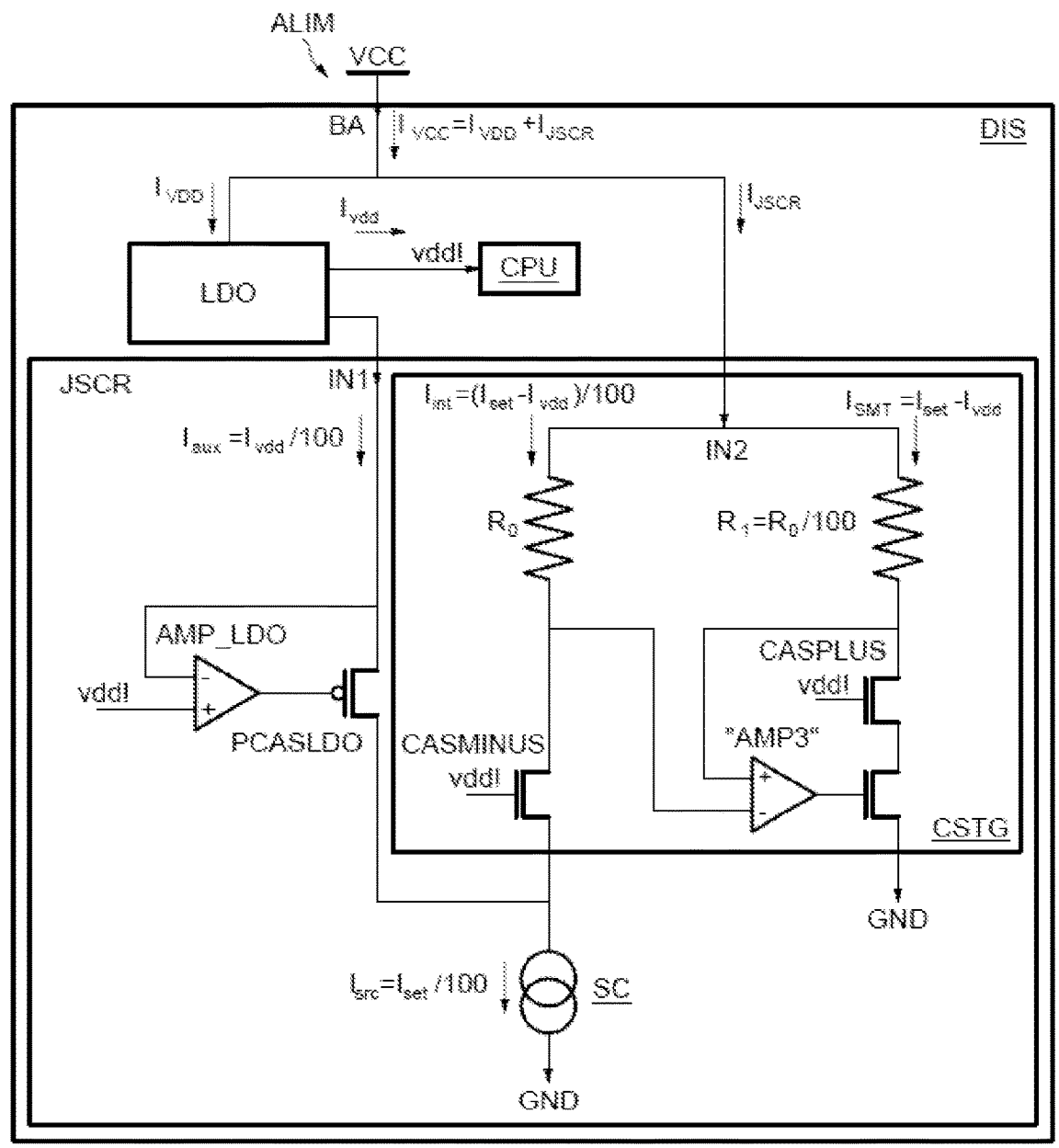
FIG. 1 illustrates an electronic device including an electronic module and a voltage regulator.

FIG. 1 illustrates an electronic device DIS, in particular a system on chip, including an electronic module, in particular a microprocessor CPU, and an LDO voltage regulator. The LDO regulator is configured to adapt a voltage VCC provided by an electrical power supply source ALIM to a desired voltage to power supply the microprocessor CPU. For example, the LDO regulator can be adapted to provide a voltage of 1.2V to the microprocessor CPU from a voltage of 3V generated by the power supply source ALIM. The LDO voltage regulator can be of the low-dropout type (also known by the expression "low-dropout regulator" or "LDO regulator").

The LDO voltage regulator has an input I1 connected to a power supply terminal BA of the electronic device DIS. The power supply terminal BA is configured to be able to be connected to the power supply source ALIM. The LDO regulator also has a first output O1 connected to a power supply terminal of the microprocessor CPU. In this way, the LDO voltage regulator is configured to draw a current $I_{vdd}$ delivered by the power supply source ALIM and to transmit this current to the microprocessor CPU. The value of current $I_{vdd}$ may vary depending on the operations that can be performed by the microprocessor.

The electronic device DIS also includes a compensation circuit JSCR configured to be able to draw a current $I_{JSCR}$ delivered by the power supply source ALIM, so that the total current $I_{VCC}$ drawn from the power supply source is constant regardless of the value of the current $I_{vdd}$ required by microprocessor CPU.

In particular, the compensation circuit JSCR includes a first input IN1 connected to a second output O2 of the LDO voltage regulator, and a second input IN2 connected to the power supply terminal BA of the electronic device DIS so as to be able to be connected to the power supply source ALIM.

The second output O2 of the voltage regulator is configured to deliver to the compensation circuit JSCR an auxiliary current $I_{aux}$ equal to $I_{vdd}/100$, that is to say one hundredth of the current $I_{vdd}$. For this purpose, the LDO voltage regulator may comprise a current mirror. The current mirror can then include a first branch having a first transistor having given dimensions, and a second branch having a second transistor with dimensions one hundred times smaller than those of the first transistor. The current mirror may also include on its first branch a number of identical transistors connected in parallel one hundred times greater than a number of identical transistors connected in parallel provided on its second branch.

The LDO regulator is therefore configured to draw a total current $I_{VDD}$ equal to the sum of the current $I_{vdd}$ required by the microprocessor and the current $I_{aux}$ equal to $I_{vdd}/100$ delivered to the compensation circuit.

The compensation circuit JSCR may comprise a first amplifier AMP_LDO configured to control a gate of a first PMOS-type transistor PCASLDO. The amplifier AMP_LDO includes an inverting input connected to the second output O2 of the LDO regulator via the first input IN1 of the compensation circuit and to the source of the transistor PCASLDO. The amplifier AMP_LDO also includes a non-inverting input connected to the first output O1 of the LDO regulator so as to receive a voltage vdd! at the input of the microprocessor CPU. Thus, the first amplifier AMP_LDO and the transistor PCASLDO allow to obtain a potential at the second output O2 of the LDO regulator identical to the potential at the first output O1 of the LDO regulator so as to ensure a current $I_{vdd}/100$ conforming to the current $I_{vdd}$ supplying the microprocessor CPU.

The compensation circuit JSCR further comprises a current source SC having a first terminal connected to the drain of the transistor PCASLDO and a second terminal connected to a cold point, in particular to a ground GND. The current source SC is of the NMOS-type and is thus configured to generate a current $I_{src}$ equal to $I_{set}/100$ towards the cold point GND. The value of the current $I_{set}$ is chosen to be greater than a maximum of the current $I_{vdd}$. The ratio between the current $I_{src}$ and the current $I_{set}$ is chosen to be identical to the ratio between the current $I_{aux}$ and $I_{vdd}$. Embodiments of such a current source are described below in relation to FIGS. 2 and 3.

The compensation circuit JSCR further comprises a compensation stage. The compensation stage comprises an NMOS-type transistor CASMINUS. The transistor CASMINUS has a gate connected to the first output of the LDO regulator so as to receive a fixed voltage allowing the transistor CASMINUS to operate as a cascode. This fixed voltage may be the voltage vdd!. The transistor CASMINUS further includes a source connected to the first terminal of the current source and to the drain of the transistor PCASLDO.

The compensation stage CSTG includes a resistor $R_0$ having a first terminal connected to the second input IN2 of the compensation circuit JSCR so as to be able to be connected to the power supply source ALIM and a second terminal connected to a drain of the transistor CASMINUS. The compensation stage also includes a resistor $R_1$ having a first terminal connected to the first terminal of the resistor $R_0$ and to the second input IN2 of the compensation circuit JSCR so as to be able to be connected to the power supply source ALIM. The value of the resistor $R_1$ is chosen so that the ratio between the resistor $R_1$ and the resistor $R_0$ is the same as the ratio between the current $I_{aux}$ and $I_{vdd}$, and the same as the ratio between the current $I_{src}$ and the current $I_{set}$. For example, the resistor $R_1$ has a value equal to $R_0/100$. The transistor CASMINUS allows the potential at the second terminal of the resistor $R_0$ to vary freely according to the current passing through this resistor $R_0$.

The compensation stage CSTG also includes an NMOS-type transistor CASPLUS. The transistor CASPLUS has a gate connected to the first output of the LDO regulator so as to receive a fixed voltage allowing the transistor CASPLUS to operate as a cascode. This fixed voltage may be the voltage vdd!. The transistor CASPLUS also has a drain connected to a second terminal of the resistor $R_1$.

The compensation stage CSTG also includes an NMOS-type transistor LV. The transistor LV has a drain connected to the source of the transistor CASPLUS and a source connected to the cold point, in particular to the ground. The transistor CASPLUS allows protection of the transistor LV from high voltages, and allows the potential at the second terminal of the resistor $R_1$ to vary freely according to the current passing through this resistor $R_1$.

The compensation stage CSTG further comprises an operational amplifier AMP3 having an inverting input connected to the second terminal of the resistor $R_0$ and a non-inverting input connected to the second terminal of the resistor $R_1$. The operational amplifier AMP3 also has an output connected to the gate of the transistor LV so as to be able to control the transistor LV. Thus, the amplifier AMP3 allows obtaining of a potential at the second terminal of the resistor $R_1$ identical to the potential at the second terminal of the resistor $R_0$.

In this way, the resistor $R_0$ is traversed by a current $I_{int}$ equal to (Iset-Ivdd)/100, and the resistor $R_1$ is traversed by a current $I_{SMT}$ equal to Iset-Ivdd.

Thus, the current $I_{VCC}$ delivered by the power supply source ALIM is equal to the sum of the current $I_{vdd}$ required by the microprocessor CPU, the current $I_{vdd}/100$ delivered at the second output O2 of the LDO regulator and the current $I_{JSCR}$ corresponding to the sum of the current $I_{int}$ passing through the resistor $R_0$ and $I_{SMT}$ passing through the resistor $R_1$. Thus, the current $I_{VCC}$ is expressed according to the following formula:

$$I_{VCC} = I_{VDD} + I_{JSCR} = I_{vdd} + (I_{set} - I_{vdd}) = 1.01 * I_{set}$$

The current $I_{VCC}$ having the value $1.01*I_{set}$ no longer depends on the current $I_{vdd}$ required by the microprocessor CPU, and is therefore constant.

Such a compensation circuit JSCR has the advantage of being relatively simple while allowing smoothing of the current drawn from the power supply source and being reactive to variations in the current $I_{vdd}$ required by the microprocessor CPU.

Figure 2:
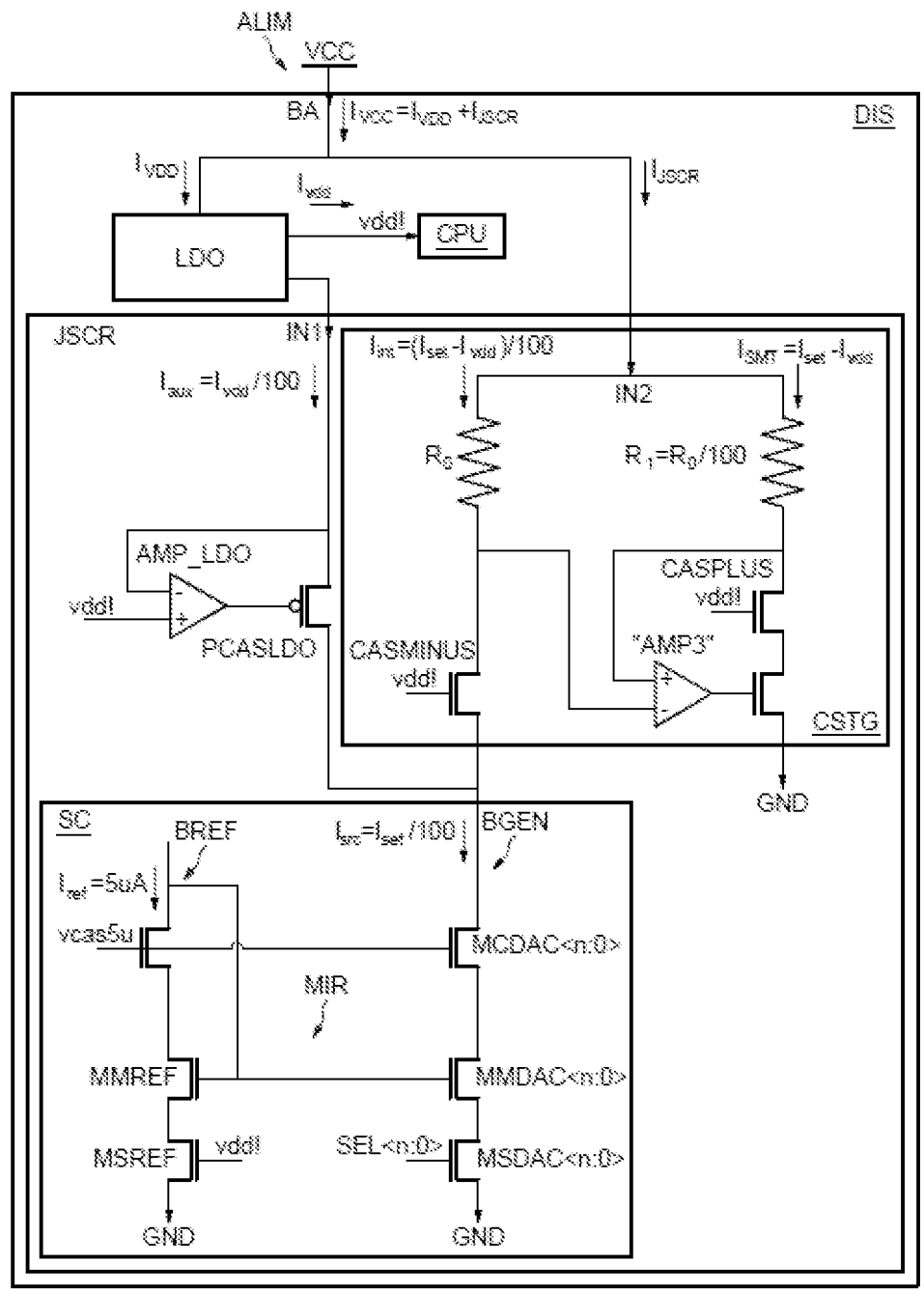
FIG. 2 illustrates an electronic device with a current source including a reference branch and at least one branch for generating current.

FIG. 2 illustrates an electronic device DIS as described previously whose current source SC allowing generating of the current $I_{src}$ is represented according to a first embodiment.

In this embodiment, the current source SC includes a reference branch BREF and at least one branch BGEN for generating current $I_{src}$.

The reference branch includes an NMOS-type cascode transistor MCREF and each current generation branch BGEN includes an NMOS-type cascode transistor MCDAC. The transistors MCREF and MCDAC each have a gate configured to receive a fixed voltage vcas5u. The drain MCREF is configured to receive a reference current $I_{ref}$ of 5 μA for example.

The current source SC further includes a current mirror MIR for each current generation branch BGEN. Each current mirror MIR allows multiplying of the reference current $I_{ref}$ in order to obtain the current $I_{src}$ equal to $I_{set}/100$ at the output of the current source. In particular, the generation branch includes an NMOS-type transistor MMREF. This transistor MMREF has a drain connected to a source of the transistor MCREF, a gate connected to a drain of the transistor MCREF and a source connected to a drain of a transistor MSREF of the reference branch. This transistor MSREF also includes a source connected to the cold point, in particular to the ground, and a gate configured to receive the voltage vdd!.

Each current generation branch includes an NMOS-type transistor MMDAC<n:0> and an NMOS-type transistor MSDAC<n:0>. The transistor MMDAC<n:0> of each current generation branch has a gate connected to the gate of the transistor MMREF, a drain connected to a source of the transistor MCDAC<n:0> of this same current generation branch, and a source connected to a drain of the transistor MSDAC<n:0> of this same current generation branch. Thus, each current mirror comprises the transistor MMREF of the reference branch and a transistor MMDAC<n:0> of a current generation branch.

Each transistor MSDAC<n:0> has a gate allowing receiving of a selection signal SEL<n:0>, and a source connected to the cold point, in particular to the ground. The selection signals allow to activate or not the various current mirrors MIR.

The total current consumed by the compensation circuit is then equal to the sum of the current $I_{src}$ equal to $I_{set}/100$ generated by the current source SC, a current consumed by the operational amplifier AMP_LDO and a current consumed by the operational amplifier AMP3. The total current consumed is therefore relatively low, and therefore has an advantage, especially for products requiring high power consumption.

Furthermore, it is also possible to increase the bias current of the amplifier AMP3 to improve the performance of the compensation circuit JSCR.

Figure 3:
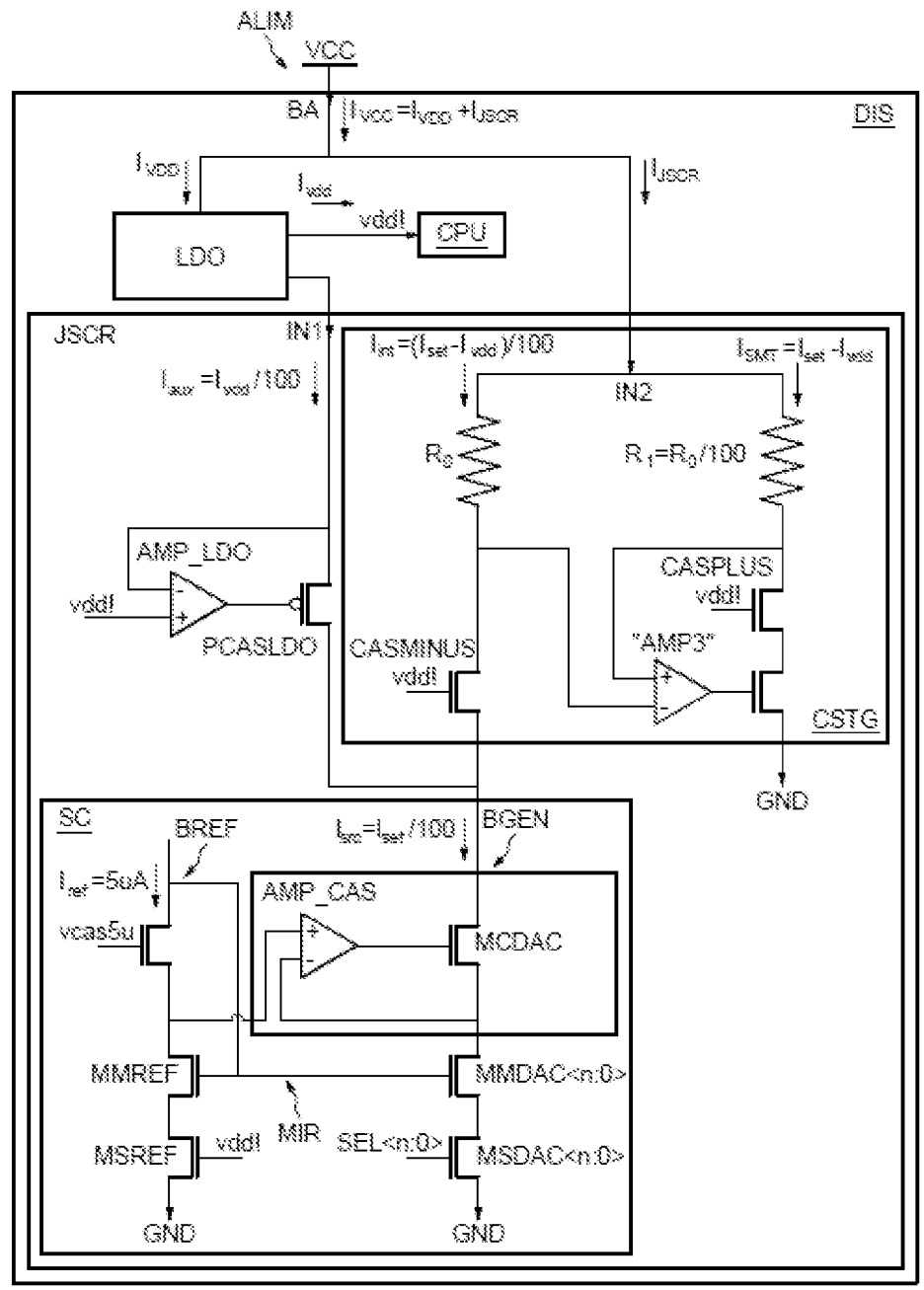
FIG. 3 illustrates an electronic device including a single common transistor for each current generation branch, which transistor is controlled by an operational amplifier.

FIG. 3 illustrates an electronic device DIS as described previously whose current source SC allowing generating of the current $I_{src}$ equal to $I_{set}/100$ is shown according to a second embodiment.

This second embodiment differs from the first embodiment in that it comprises a single common transistor MCDAC for each current generation branch. This transistor MCDAC is controlled by an operational amplifier AMP_CAS and not by the signal vcas5u.

In particular, the operational amplifier AMP_CAS has a non-inverting input connected to the drain of the transistor MMREF, and an inverting input connected to the drain of the transistor MMDAC.

In this way, the drain voltage of the transistor MMDAC is identical to the voltage at the drain of the transistor MCREF. It is thus possible to use a smaller transistor MCDAC allowing reducing of parasitic capacitances so that the compensation circuit is more reactive to current variations $I_{vdd}$. The bandwidth of the amplifier does not impact the compensation circuit because the current $I_{ref}$ is constant.

The total current consumed by the compensation circuit is then equal to the sum of the current $I_{set}/100$ generated by the current source, the current supplying the operational amplifier AMP_LDO, the current consumed by the operational amplifier AMP3 and the current Iamp_cas supplying the amplifier AMP_CAS. Such a total current is also relatively low compared to known compensation circuits.

Of course, the present invention is amenable to various variants and modifications which will occur to the person skilled in the art. For example, it is also possible to provide an electronic device including several LDO voltage regulators and several electronic modules connected to the various voltage regulators. The compensation circuit then has several inputs IN1 for the various voltage regulators so as to receive the auxiliary currents generated by the various regulators. The current source SC and the compensation stage CSTG are then connected to the various LDO regulators via several parallel branches connected to the inputs IN1, each branch including a transistor PCAS_LDO controlled by an operational amplifier AMP_LDO as described above.

What is claimed is:

1. An electronic device comprising:
   a power supply terminal configured to be connected to a power supply;

at least one voltage regulator connected to the power supply terminal;

at least one electronic module connected to the at least one voltage regulator and configured to consume an electronic module current coming from the power supply; and a compensation circuit connected to the at least one voltage regulator and configured to receive an auxiliary current generated by the at least one voltage regulator and being equal to a first fraction of the electronic module current consumed by the at least one electronic module, the compensation circuit including:

a current source connected to the at least one voltage regulator so as to receive the auxiliary current and being configured to supply to a cold point a source current greater than a maximum value of the electronic module current consumed by the at least one electronic module; and a compensation stage including:

a first resistor and a second resistor each having a first terminal connected to the power supply terminal, the first resistor having a first resistive value equal to a second resistive value of the second resistor multiplied by an inverse of a multiplication factor of the first fraction, the first resistor having a second terminal connected to the current source so as to be traversed by an intermediate current equal to a difference between the source current and the auxiliary current;

a first transistor having a drain connected to a second terminal of the second resistor and a source connected to the cold point; and a first operational amplifier configured to control the first transistor and having an inverting input connected to the second terminal of the first resistor and a non-inverting input connected to the second terminal of the second resistor, so that the second resistor is traversed by a complementary current equal to the intermediate current multiplied by the multiplication factor.

2. The device according to claim 1, wherein the current source and the compensation stage are connected to the at least one voltage regulator via a second transistor controlled by a second operational amplifier having an inverting input connected to a source of the second transistor and a non-inverting input configured to receive a voltage delivered by the at least one voltage regulator to the at least one electronic module.

3. The device according to claim 1, wherein the compensation stage includes:

a third transistor having a drain connected to the second terminal of the first resistor and a source connected to the current source so that the second terminal of the first resistor is connected to the current source via the third transistor; and a fourth transistor having a drain connected to the second terminal of the second resistor and a source connected to the drain of the first transistor so that the second terminal of the second resistor is connected to the drain of the first transistor via the fourth transistor;

the third transistor and the fourth transistor each having a gate configured to receive a fixed voltage allowing the third transistor and the fourth transistor to operate as cascodes.

4. The device according to claim 1, wherein the current source comprises at least one current mirror configured to generate the source current from a reference current.

5. The device according to claim 4, wherein the current source includes:

a reference branch comprising:

a reference transistor of the at least one current mirror;

a first cascode transistor having a drain configured to receive the reference current and connected to a gate of the reference transistor, a source connected to a drain of the reference transistor, and a gate configured to receive a fixed voltage; and a first selection transistor having a drain connected to a source of the reference transistor, a source connected to the cold point, and a gate configured to receive a voltage delivered by the at least one voltage regulator to the at least one electronic module; and an auxiliary current generation branch for each current mirror including:

a copy transistor of the current mirror having a gate connected to the gate of the reference transistor and being configured to at least partly generate the source current;

a second cascode transistor having a drain connected to a second output of the at least one voltage regulator, and a source connected to a drain of the copy transistor; and a second selection transistor having a drain connected to a source of the copy transistor, and a source connected to the cold point.

6. The device according to claim 5, wherein the second selection transistor of the auxiliary current generation branch of each current mirror has a gate configured to be controlled by a selection signal.

7. The device according to claim 5, wherein the second cascode transistor is common to each generation branch, the current source further including a third operational amplifier having a non-inverting input connected to the drain of the reference transistor, an inverting input connected to the source of the common second cascode transistor, and an output connected to a gate of the second cascode transistor.

8. An electronic device comprising:

a power supply terminal configured to be connected to a power supply;

at least one voltage regulator connected to the power supply terminal;

at least one electronic module connected to the at least one voltage regulator and configured to consume an electronic module current coming from the power supply; and a compensation circuit connected to the at least one voltage regulator and configured to receive an auxiliary current generated by the at least one voltage regulator and being equal to a first fraction of the electronic module current consumed by the at least one electronic module, the compensation circuit including:

a current source connected to the at least one voltage regulator so as to receive the auxiliary current and being configured to supply to a cold point a source current greater than a maximum value of the electronic module current consumed by the at least one electronic module, wherein the current source comprises:

at least one current mirror configured to generate the source current from a reference current;

a reference branch; and an auxiliary current generation branch for each current mirror; and a compensation stage including:
- a first resistor and a second resistor each having a first terminal connected to the power supply terminal, the first resistor having a first resistive value equal to a second resistive value of the second resistor multiplied by an inverse of a multiplication factor of the first fraction, the first resistor having a second terminal connected to the current source so as to be traversed by an intermediate current equal to a difference between the source current and the auxiliary current;
- a first transistor having a drain connected to a second terminal of the second resistor and a source connected to the cold point; and
- a first operational amplifier configured to control the first transistor and having an inverting input connected to the second terminal of the first resistor and a non-inverting input connected to the second terminal of the second resistor, so that the second resistor is traversed by a complementary current equal to the intermediate current multiplied by the multiplication factor.

9. The device according to claim 8, wherein the current source and the compensation stage are connected to the at least one voltage regulator via a second transistor controlled by a second operational amplifier having an inverting input connected to a source of the second transistor and a non-inverting input configured to receive a voltage delivered by the at least one voltage regulator to the at least one electronic module.

10. The device according to claim 9, wherein the compensation stage includes:
- a third transistor having a drain connected to the second terminal of the first resistor and a source connected to the current source so that the second terminal of the first resistor is connected to the current source via the third transistor; and
- a fourth transistor having a drain connected to the second terminal of the second resistor and a source connected to the drain of the first transistor so that the second terminal of the second resistor is connected to the drain of the first transistor via the fourth transistor;
- the third transistor and the fourth transistor each having a gate configured to receive a fixed voltage allowing the third transistor and the fourth transistor to operate as cascodes.

11. The device according to claim 8, wherein the compensation stage includes:
- a third transistor having a drain connected to the second terminal of the first resistor and a source connected to the current source so that the second terminal of the first resistor is connected to the current source via the third transistor; and
- a fourth transistor having a drain connected to the second terminal of the second resistor and a source connected to the drain of the first transistor so that the second terminal of the second resistor is connected to the drain of the first transistor via the fourth transistor;
- the third transistor and the fourth transistor each having a gate configured to receive a fixed voltage allowing the third transistor and the fourth transistor to operate as cascodes.

12. The device according to claim 8, wherein the reference branch comprises:
- a reference transistor of the at least one current mirror;
- a first cascode transistor having a drain configured to receive the reference current and connected to a gate of the reference transistor, a source connected to a drain of the reference transistor, and a gate configured to receive a fixed voltage; and
- a first selection transistor having a drain connected to a source of the reference transistor, a source connected to the cold point, and a gate configured to receive a voltage delivered by the at least one voltage regulator to the at least one electronic module.

13. The device according to claim 12, wherein each auxiliary current generation branch comprises:
- a copy transistor of the current mirror having a gate connected to the reference branch and being configured to at least partly generate the source current;
- a second cascode transistor having a drain connected to a second output of the at least one voltage regulator, and a source connected to a drain of the copy transistor; and
- a second selection transistor having a drain connected to a source of the copy transistor, a source connected to the cold point, and a gate configured to be controlled by a selection signal.

14. The device according to claim 13, wherein the second cascode transistor is common to each generation branch, the current source further including a third operational amplifier having a non-inverting input connected to the drain of the reference transistor, an inverting input connected to the source of the common second cascode transistor, and an output connected to a gate of the second cascode transistor.

* * * * *